(12) United States Patent
Yashiro et al.

(10) Patent No.: US 8,913,782 B2
(45) Date of Patent: Dec. 16, 2014

(54) OBJECT DETECTION APPARATUS AND METHOD THEREFOR

(75) Inventors: Satoshi Yashiro, Yokohama (JP);
Hiroshi Tojo, Fuchu (JP); Muling Guo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1168 days.

(21) Appl. No.: 12/685,521

(22) Filed: Jan. 11, 2010

(65) Prior Publication Data
US 2010/0226538 A1   Sep. 9, 2010

(30) Foreign Application Priority Data
Jan. 13, 2009   (JP) ................. 2009-005020

(51) Int. Cl.
*G06K 9/00*   (2006.01)
*G06T 7/00*   (2006.01)
*G06T 7/20*   (2006.01)
*G06K 9/62*   (2006.01)

(52) U.S. Cl.
CPC ..... *G06T 7/0081* (2013.01); *G06T 2207/30201* (2013.01); *G06K 9/00261* (2013.01); *G06K 9/6257* (2013.01); *G06T 7/0087* (2013.01); *G06T 7/208* (2013.01); *G06T 2207/10016* (2013.01)
USPC ............................ 382/103; 382/115; 382/118

(58) Field of Classification Search
CPC ..... G06T 7/0081; G06T 7/0087; G06T 7/208; G06T 2207/30201; G06T 2207/10016; G06K 9/00261; G06K 9/6257
USPC ......... 382/100, 103–104, 106–107, 115, 118, 382/181, 164–165, 167, 218, 232, 250, 382/284; 348/722.1, 143, 149, 150, 169, 348/14.16, 154, 77; 711/209; 700/86, 94; 706/62, 45, 47, 59, 12, 25
See application file for complete search history.

(56) References Cited

U.S. PATENT DOCUMENTS

| | | | |
|---|---|---|---|
| 5,635,982 A * | 6/1997 | Zhang et al. | 348/231.99 |
| 5,850,470 A * | 12/1998 | Kung et al. | 382/157 |
| 5,892,520 A * | 4/1999 | Ioka et al. | 345/474 |
| 6,463,163 B1 * | 10/2002 | Kresch | 382/103 |
| 6,493,163 B1 * | 12/2002 | Reed et al. | 360/51 |
| 6,940,545 B1 * | 9/2005 | Ray et al. | 348/222.1 |

(Continued)

FOREIGN PATENT DOCUMENTS

| | | |
|---|---|---|
| JP | 62-202292 A | 9/1987 |
| JP | 2006-209755 A | 8/2006 |
| JP | 2008-033424 A | 2/2008 |
| JP | 2008-250999 A | 10/2008 |

*Primary Examiner* — Hadi Akhavannik
*Assistant Examiner* — Mehdi Rashidian
(74) *Attorney, Agent, or Firm* — Canon USA Inc IP Division

(57) ABSTRACT

An image processing apparatus includes a moving image input unit configured to input a moving image, an object likelihood information storage unit configured to store object likelihood information in association with a corresponding position in an image for each object size in each frame included in the moving image, a determination unit configured to determine a pattern clipping position where a pattern is clipped out based on the object likelihood information stored in the object likelihood information storage unit, and an object detection unit configured to detect an object in an image based on the object likelihood information of the pattern clipped out at the pattern clipping position determined by the determination unit.

9 Claims, 14 Drawing Sheets

(56) References Cited

U.S. PATENT DOCUMENTS

| | | | |
|---|---|---|---|
| 7,143,434 B1* | 11/2006 | Paek et al. | 725/142 |
| 7,212,651 B2* | 5/2007 | Viola et al. | 382/103 |
| 7,366,330 B2* | 4/2008 | Ito | 382/118 |
| 7,583,294 B2* | 9/2009 | Ray et al. | 348/222.1 |
| 8,107,676 B2* | 1/2012 | Senior | 382/103 |
| 8,194,938 B2* | 6/2012 | Wechsler et al. | 382/118 |
| 8,195,598 B2* | 6/2012 | Hua et al. | 706/62 |
| 8,243,159 B2* | 8/2012 | Okada et al. | 348/222.1 |
| 8,315,430 B2* | 11/2012 | Kovtun et al. | 382/103 |
| 2005/0207649 A1* | 9/2005 | Enomoto et al. | 382/190 |
| 2006/0008173 A1* | 1/2006 | Matsugu et al. | 382/274 |
| 2007/0025722 A1* | 2/2007 | Matsugu et al. | 396/263 |
| 2008/0037837 A1* | 2/2008 | Noguchi et al. | 382/118 |
| 2008/0235165 A1* | 9/2008 | Movellan et al. | 706/12 |
| 2008/0317378 A1* | 12/2008 | Steinberg et al. | 382/275 |
| 2009/0222388 A1* | 9/2009 | Hua et al. | 706/12 |
| 2009/0296989 A1* | 12/2009 | Ramesh et al. | 382/103 |
| 2009/0324014 A1* | 12/2009 | Kato et al. | 382/103 |

* cited by examiner

FRAME
t = n-1

MOTION VECTOR

FRAME
t = n

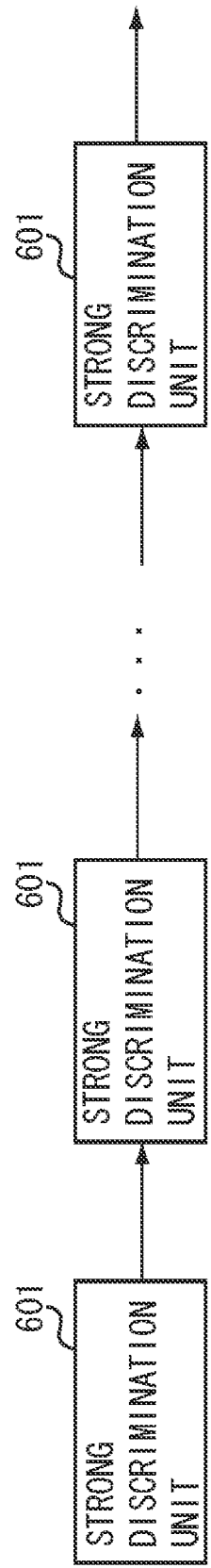

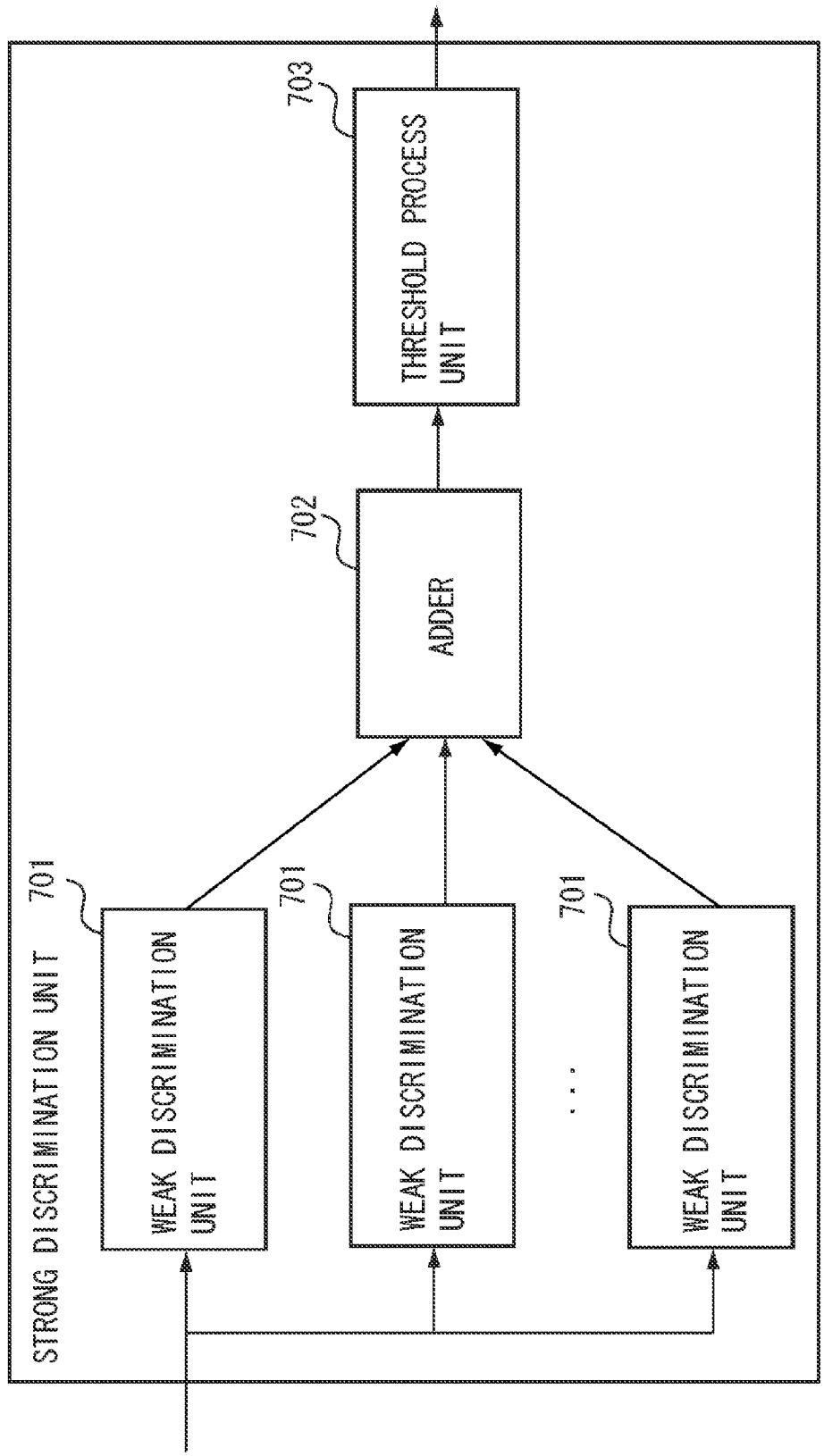

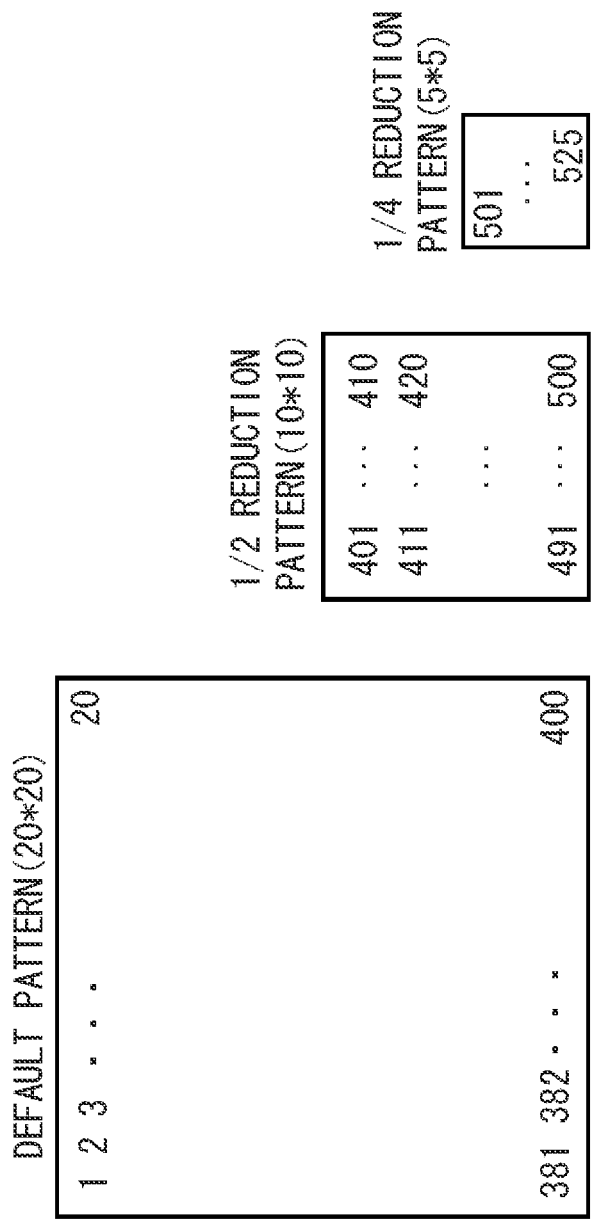

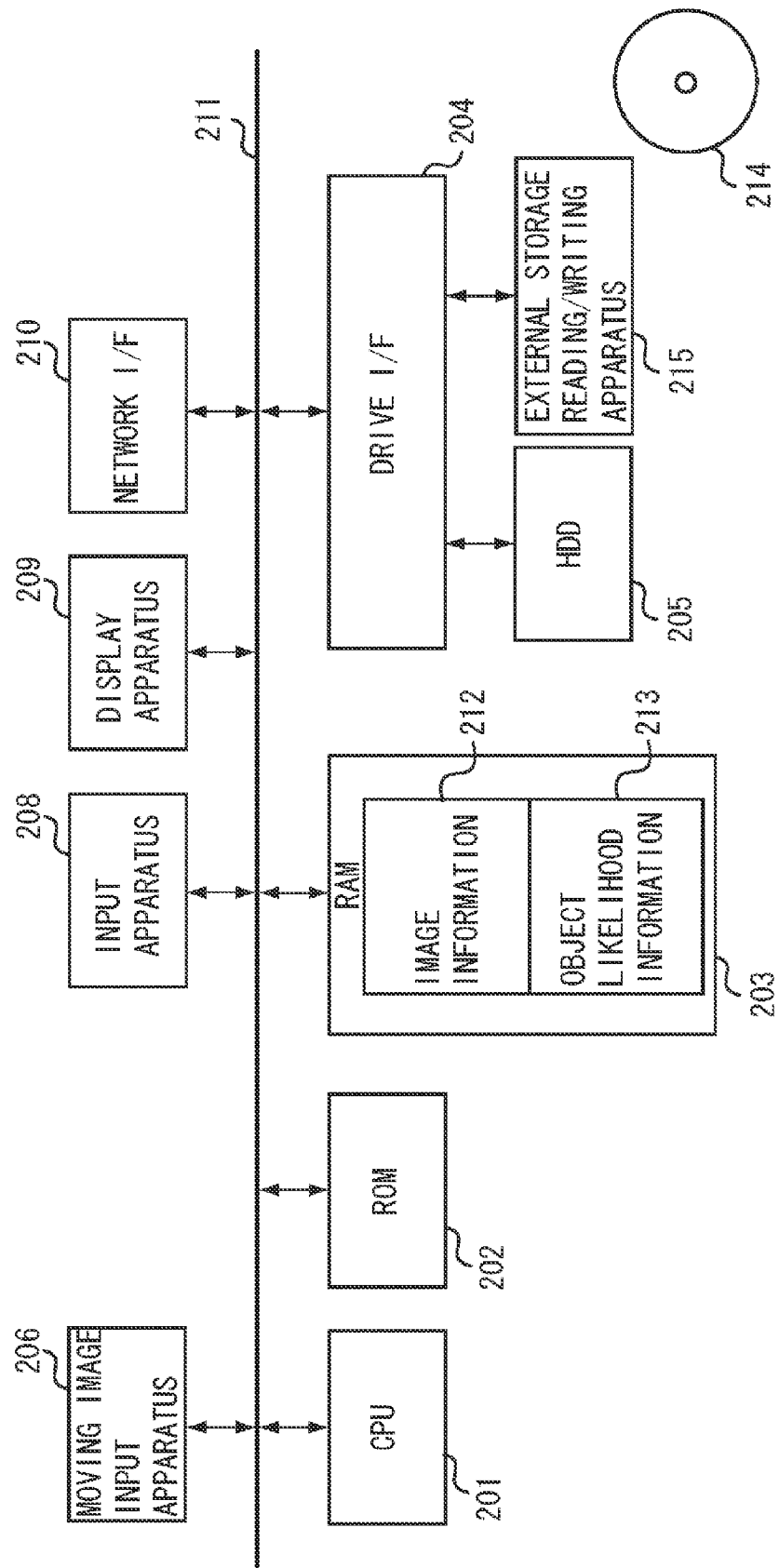

OBJECT DETECTION APPARATUS AND
METHOD THEREFOR

BACKGROUND OF THE INVENTION

1. Field of the Invention

The present invention relates to an apparatus configured to detect an object from a moving image and a method thereof.

2. Description of the Related Art

A technique for detecting an object from an image is discussed in "Rapid Object Detection using Boosted Cascade of Simple Features" in Proceedings of The IEEE Conference on Computer Vision and Pattern Recognition (CVPR'01), for example. In the technique, a sub-window of a predetermined size in an image is scanned and two-class discrimination is performed for determining whether a pattern image which is clipped out from an image in the sub-window is an object. In the discrimination, a large number of weak discriminators are effectively combined based on adaptive boosting (AdaBoost) to form discriminators, so that accuracy in discrimination is enhanced. In another technique, such discriminators are connected in series to form a cascade detector. In further another technique, weak discriminators are each constructed with Haar-like rectangular feature quantities, and the rectangular feature quantities are computed at high speed using an integral image. The cascade detector uses simpler discriminators (for a less amount of calculation) in former stages to remove pattern candidates that do not include an object obviously. In latter stages, the detector uses more complicated discriminators (for a more amount of calculation) having higher identification capability for discriminating the object from the other pattern candidates. In this case, the complicated discrimination process is not necessary for all of the candidates, so that the discrimination can be performed at high speed.

Japanese Patent Application Laid-Open No. 2003-44853 discusses a technique for increasing discrimination speed by removing patterns that do not include an object in former stage. The technique uses a face learning dictionary for identifying a face image and a non-face image and edge images of a target image, extracts partial images that each seems to include a face image from the target image, and determines whether each of the extracted partial images includes the face image by referring to the learning dictionary.

The above described techniques have been developed to process only one image, and do not discuss any approach for efficiently searching for an object from a moving image.

Japanese Patent Application Laid-Open No. 2007-257358 discusses a method for efficiently detecting an object from a moving image by using frames that are close in terms of time and highly correlated to each other. In the method, when a predetermined object is detected in some hierarchy in an object detection process, the object detection process of a next input image is performed on hierarchical images in the same hierarchy which includes the predetermined object.

In the above technique, a detection result is used to control a region to be searched for in a next frame, and the regions without the object at that time are excluded from the searching. Accordingly, the overall regions need to be regularly processed to search for an object that comes into a frame later, or an object that steps out of shade, so that detection of an object cannot perform efficiently.

SUMMARY OF THE INVENTION

The present invention relates to a technique for efficiently detecting an object from a moving image.

According to an aspect of the present invention, an image processing apparatus includes a moving image input unit configured to input a moving image, an object likelihood information storage unit configured to store object likelihood information in association with a corresponding position in an image for each object size in each frame in the moving image, a determination unit configured to determine a pattern clipping position where a pattern is clipped out based on the object likelihood information stored in the object likelihood information storage unit, and an object detection unit configured to detect an object in an image based on the object likelihood information of the pattern clipped out at the pattern clipping position determined by the determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 schematically illustrates an example of a configuration of an object discrimination unit.

FIG. 9 illustrates an example of a configuration of a strong discrimination unit.

FIG. 13 illustrates a relationship between multi resolution patterns and sequence numbers of pixels.

FIG. 14 illustrates an example of a hardware configuration of an image processing apparatus.

DESCRIPTION OF THE EMBODIMENTS

Various exemplary embodiments, features, and aspects of the invention will be described in detail below with reference to the drawings. It is to be noted that the relative arrangement of the components, the numerical expressions, and numerical values set forth in these embodiments are not intended to limit the scope of the present invention.

Figure 1:
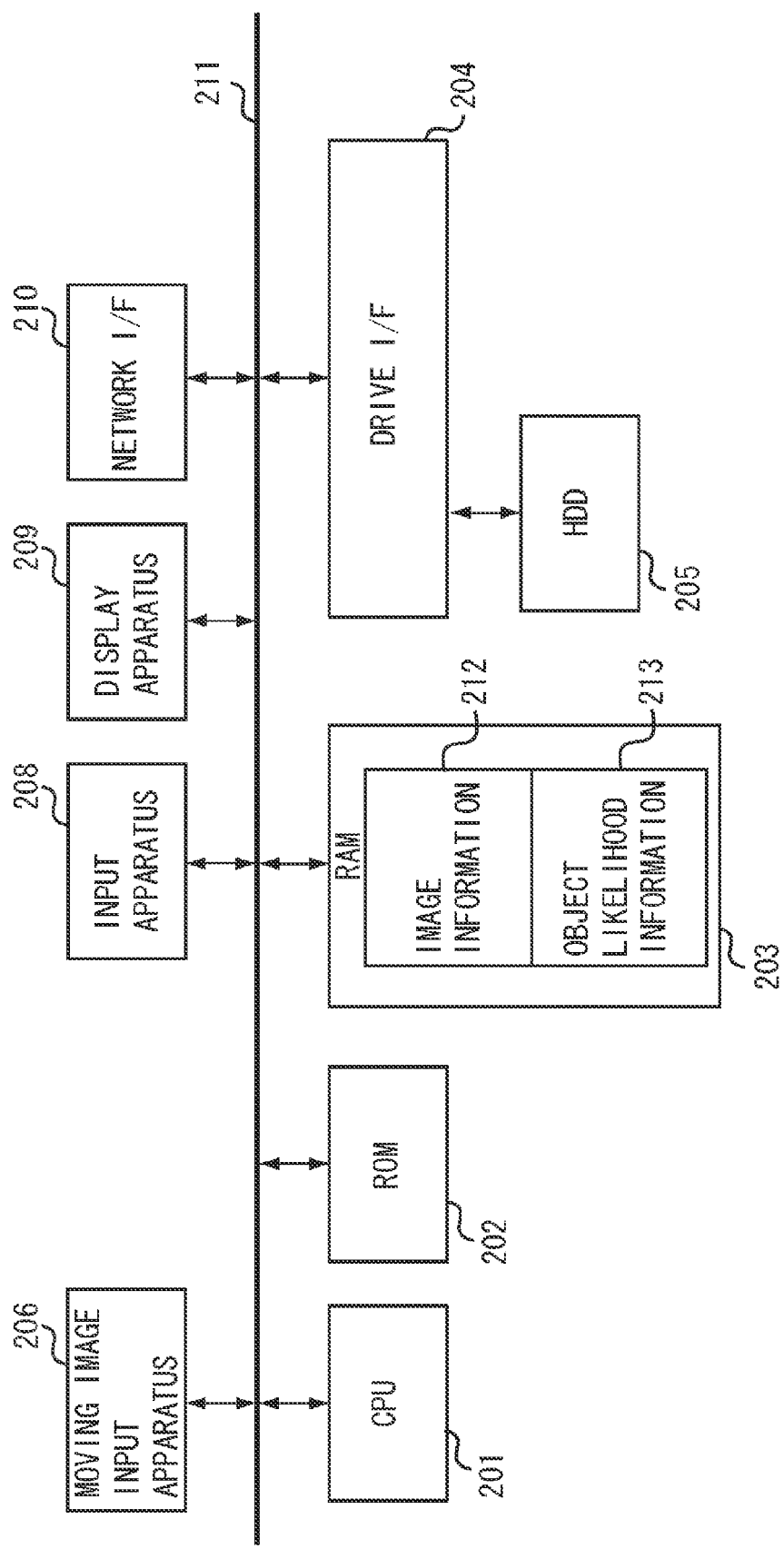
FIG. 1 illustrates an example of a hardware configuration of an image processing apparatus.

FIG. 1 illustrates an example of a hardware configuration of an image processing apparatus according to a first exemplary embodiment. A central processing unit (CPU) 201 executes commands according to a program stored in a read-only memory (ROM) 202 and a random access memory (RAM) 203. The command execution by the CPU 201 results in achievement of functions and operations in the flowcharts, which will be described below. The ROM 202 stores programs in the present exemplary embodiment and other control programs and data therein. The RAM 203 stores image information 212, object likelihood information 213, and other temporal data therein.

A drive interface (I/F) 204 is an interface, such as integrated drive electronics (IDE) and small computer system interface (SCSI), between the image processing apparatus and external storage apparatuses. A hard disk (HDD) 205 stores programs for extracting images and patterns, and face/non-face sample patterns therein. A moving image input apparatus 206 inputs moving images acquired from a digital video camera and a network camera for example. An input apparatus 208 includes a keyboard and a mouse, and is used by an operator for data input. A display apparatus 209 may include a cathode ray tube or a liquid crystal display for example. A network I/F 210 may include a modem or local area network (LAN) for connecting the image processing apparatus to network such as the Internet or the Intranet. A bus 211 connects the above described components and enables mutual data input and output among them.

Figure 2:
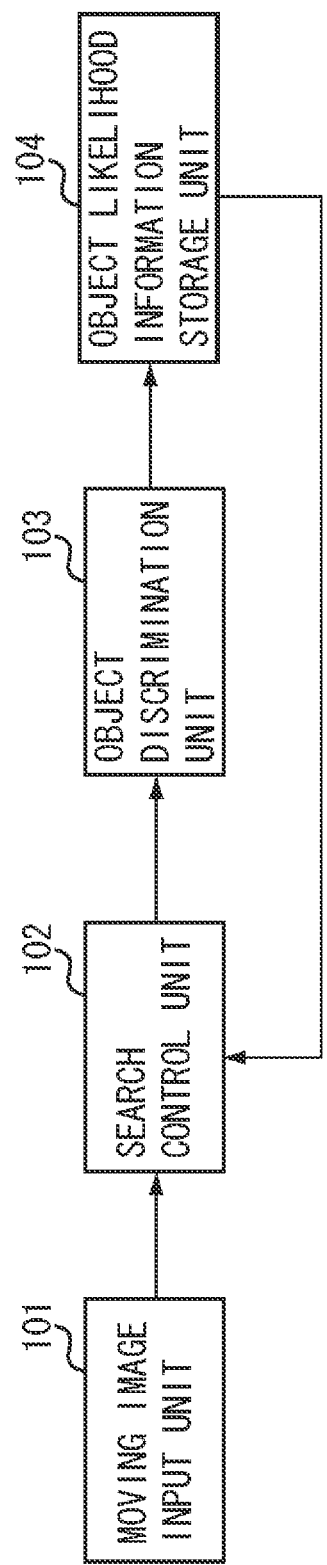
FIG. 2 illustrates a schematic configuration of an image processing apparatus.

FIG. 2 illustrates a schematic configuration of the image processing apparatus. A moving image input unit 101 inputs each frame of a moving image input from the moving image input apparatus 206. A search control unit 102 controls a scanning method, which will be described below, of a sub-window 501 in FIG. 4 for evaluation of an object. More specifically, the search control unit 102 controls a width of scanning based on object likelihood information of a previous frame at a scanning position.

An object discrimination unit 103 evaluates whether image information of the sub-window 501 includes an object, outputs object likelihood, and determines the image information as the object based on a predetermined threshold. An object likelihood information storage unit 104 stores a position of an input image and an object size, each in association with object likelihood information.

Figure 3:
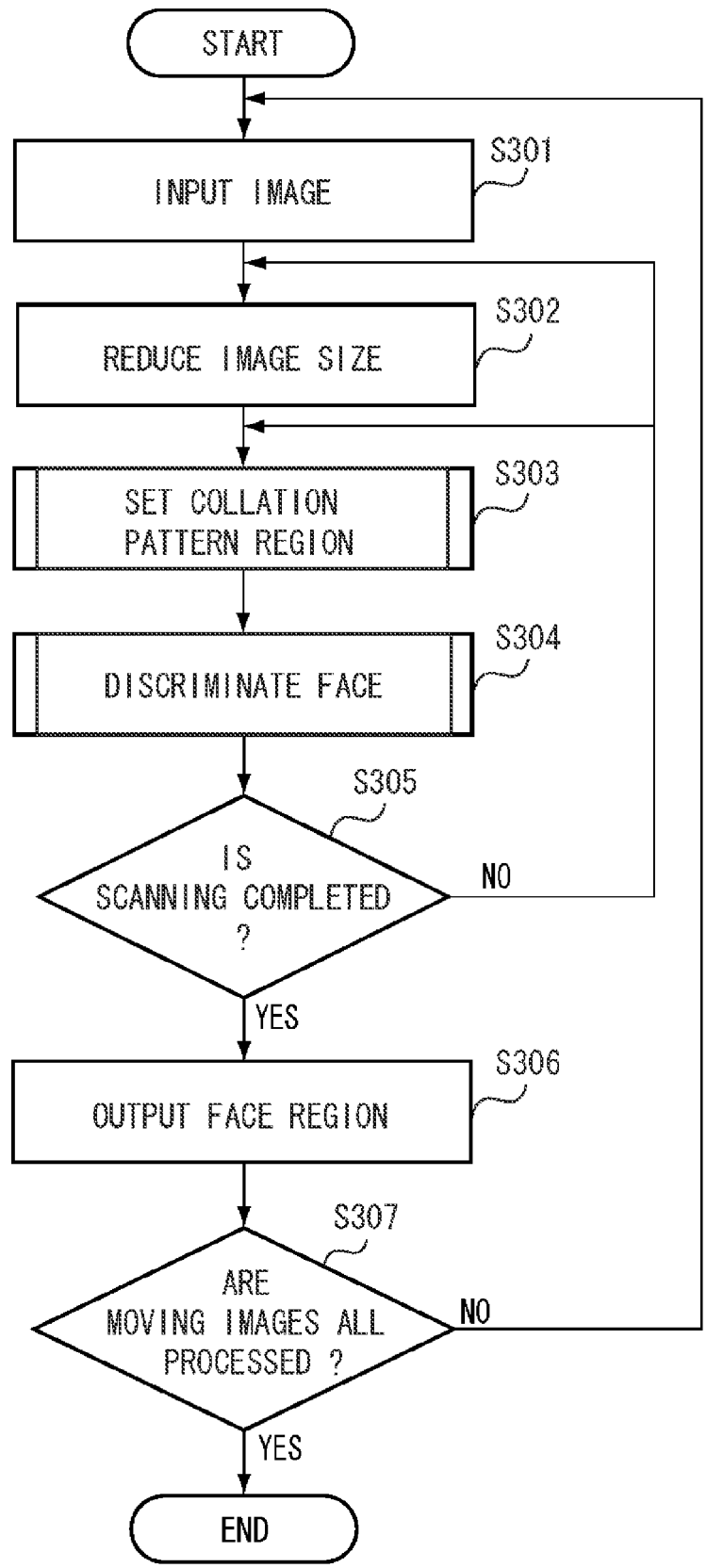
FIG. 3 is a flowchart schematically illustrating an example of processing in an exemplary embodiment.

FIG. 3 is a flowchart schematically illustrating an example of processing in the present exemplary embodiment. In the present exemplary embodiment, processing for detecting a human face as an example of an object is described below. In step S301, the moving image input unit 101 loads image data of each frame input from the moving image input apparatus 206 into the RAM 203.

The loaded image data is two dimensional array data configured with eight-bit pixels, and includes red (R), green (G), and blue (B) components. When image data is compressed using a format such as Moving Picture Experts Group (MPEG) and Motion Joint Photographic Experts Group (JPEG), the moving image input unit 101 decompresses the image data using a predetermined decompression method to obtain the image data configured with R, G, and B pixels. The moving image input unit 101 in the present exemplary embodiment converts the RBG data into luminance image data which is stored in the RAM 203 for later processing.

When YCrCb image data is input, the moving image input unit 101 may use the Y component as luminance image data.

The processing described below can be performed on, luminance image data, but not limited to this. One piece of image data on which image processing such as normalization of brightness and contrast adjustment, color conversion, edge image processing that indicate edge intensity in a predetermined direction, differentiation, or integration, is performed or a plurality of pieces of the image data on which different types of the image processing is performed may be applied to the processing described below.

In step S302, the moving image input unit 101 reduces the image data by a predetermined magnification to generate luminance image data. By generating the luminance image data in the present exemplary embodiment, detection processing can be serially performed on image data of a plurality of sizes so that faces of different sizes can be detected. For example, a reduction process is serially performed on a plurality of images having different sizes that are each magnified by about 1.2 times, for a later detection process.

Figure 4:
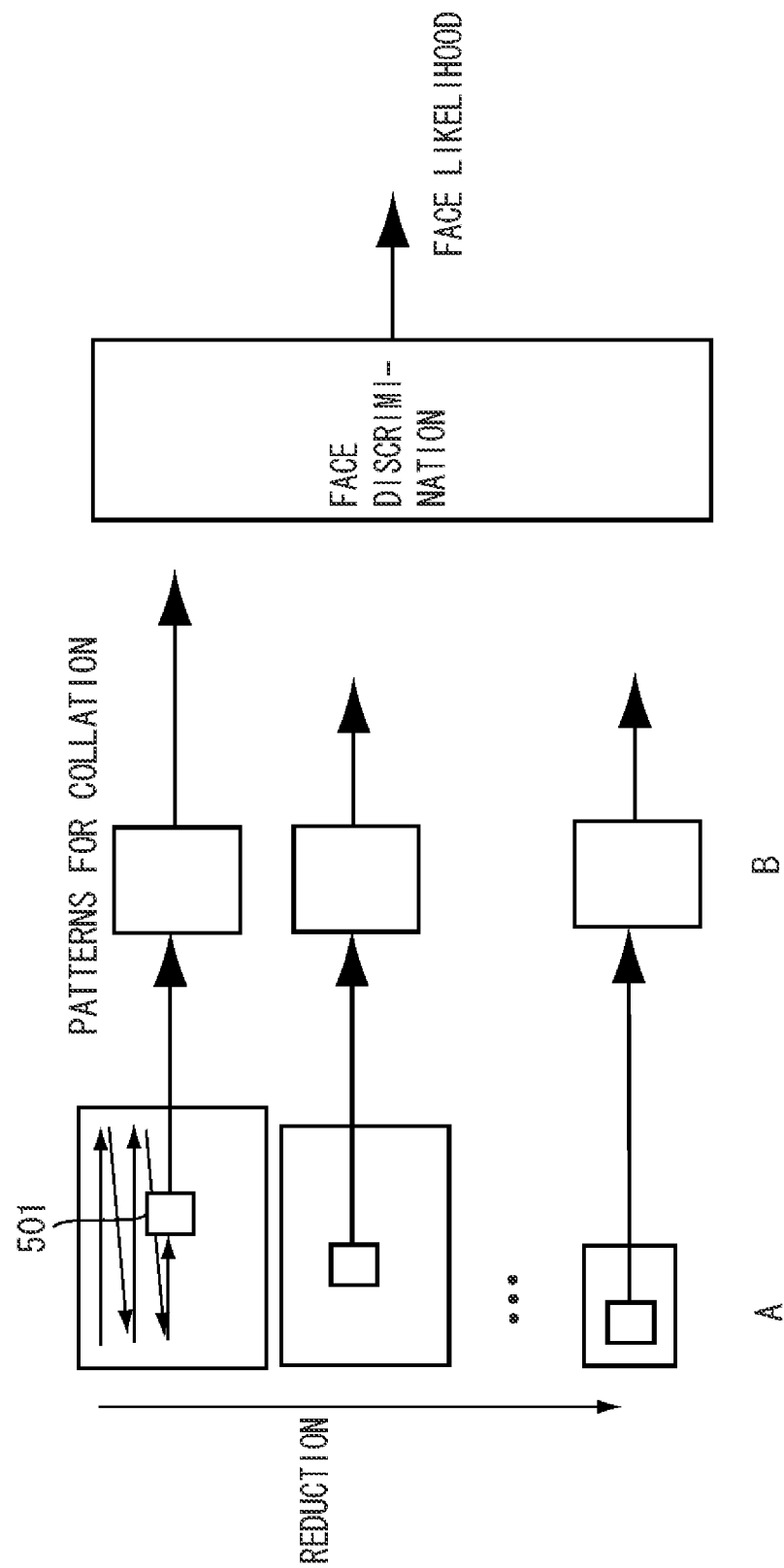
FIG. 4 illustrates an example of a scanning method of a sub-window.

In FIG. 4, the reduced images in step S302 are illustrated in column A, and a rectangular region of a predetermined size is clipped out from each of the reduced images. In step S303, the search control unit 102 sets a sub-window of a predetermined size on the reduced luminance image data, which will be described below in detail with reference to FIG. 6.

In step S304, the object discrimination unit 103 discriminates whether a pattern for collation is a face pattern or a non-face pattern, which will be described below in detail with reference to FIG. 12. In steps S303 to S305, the reduced luminance images that are output in step S302 is repeatedly scanned as illustrated in FIG. 4 using the sub-window 501. The reduction process of different magnifications is serially applied to repeat the processes in steps S302 to S305.

In step S305, for example, the object discrimination unit 103 determines whether the above repetition of scanning is completed. If the scanning is completed (YES in step S305), in step S306, the object discrimination unit 103 outputs the pattern that is determined as a face to the display apparatus 209 as a face region.

Figure 5:
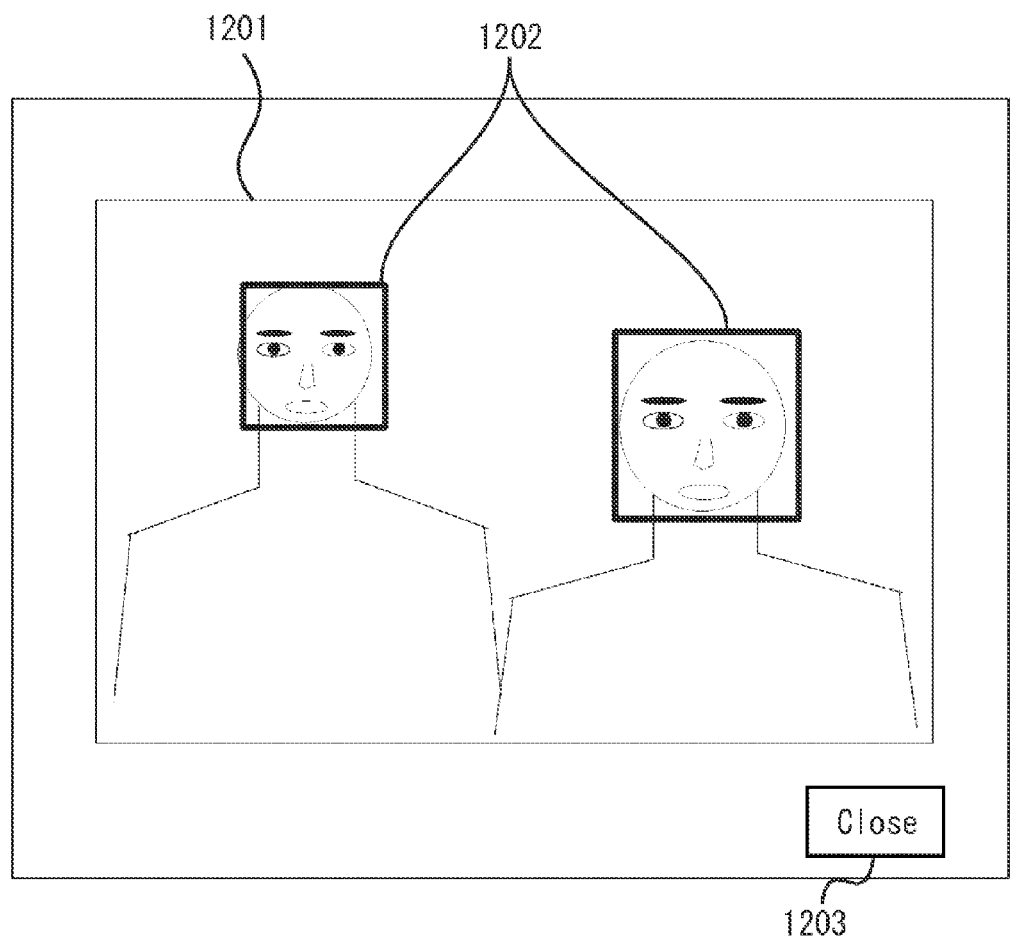
FIG. 5 illustrates an example of a screen displayed on a display apparatus.

FIG. 5 illustrates an example of a screen to be displayed on the display apparatus 209. In FIG. 5, results of face detection are superimposed on an input image 1201. Each of face detection frames 1202 indicates a position and a size of the face pattern extracted by the object discrimination unit 103. A button 1203 is used to close the screen.

In step S307, for example, the moving image input unit 101 determines whether the moving images are all processed. If all of the moving images are not processed yet (No in step S307), the processes in steps S301 to S306 are repeated.

Next, object likelihood information 213 is described below. The object likelihood information 213 is data corresponding to one input image based on a movable region of a sub-window in each reduce image in the column A in FIG. 4. In other words, the object likelihood information 213 is one two-dimensional data segment per reduced image. The two-dimensional data segment has a width calculated by: the (width of reduced image)−(the width of a sub-window)+1, and has a height calculated by: (the height of reduced image)−(the height of a sub-window)+1.

For example, the object discrimination unit 103 calculates a memory address based on the position of the sub-window to store the object likelihood information in the memory address. For example, the object discrimination unit 103 stores the object likelihood information obtained by evaluating a pattern in the sub-window in a object likelihood information storage unit 104 at a position corresponding to the upper left coordinate of the sub-window. The object discrimination unit 103 may obtain binary object likelihood information by quantization.

Next, the search control process in step S303 is described below in detail. A column B in FIG. 4 illustrates repetition of scanning of each reduce image horizontally and vertically in series according to Proceedings of The IEEE Conference on Computer Vision and Pattern Recognition (CVPR'01) Rapid Object Detection using Boosted Cascade of Simple Features.

As illustrated in FIG. 4, when a sub-window is set from an image of a larger reduction ratio and discrimination of face from an image pattern in the sub-window is performed, a face of a larger size relative to the image is discriminated. The search control unit 102 in the present exemplary embodiment sets a search position, that is the position of the sub-window used for pattern evaluation, based on the object likelihood information in former frames.

Figure 6:
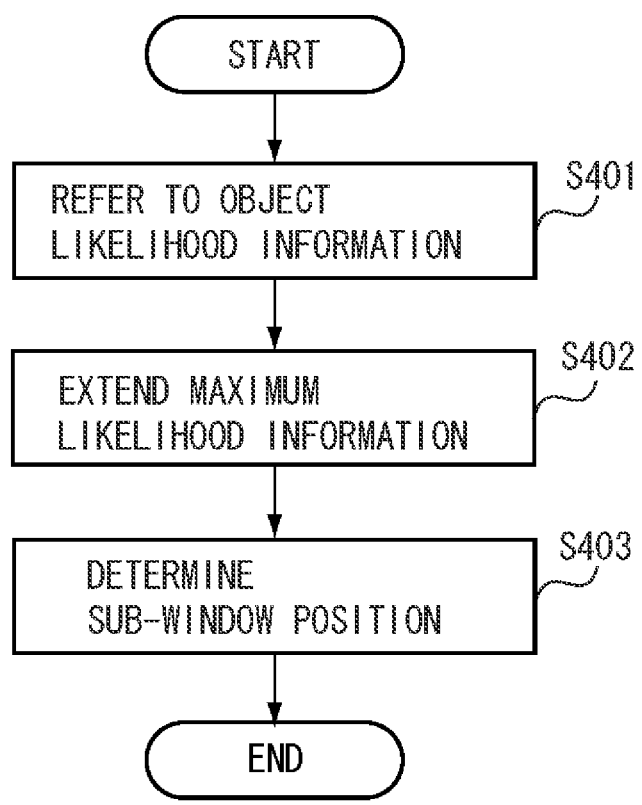
FIG. 6 is a flowchart illustrating an example of processing of a search control unit.

FIG. 6 is a flowchart illustrating an example of an operation of the search control unit 102. In step S401, the search control unit 102 refers to the object likelihood information stored in the object likelihood information storage unit 104. Since a first frame image is not associated with the object likelihood information, the search control unit 102 initializes the object likelihood information at a predetermined value of likelihood. Using a coordinate that has not been evaluated for long time causes error in a relation between stored likelihood and images. Accordingly, the search control unit 102 regularly performs the object discrimination process.

In the object discrimination process, the search control unit 102 searches for an object at positions that are uniformly distributed in terms of time and space. For example, the search control unit 102 does not use a search method in which full search is performed on the n-th frames (n is an even number) but no search is performed on the (n−1)th frames. More specifically, the search control unit 102 may perform the searching on the n-th lines in the n-th frames (n is an even number) and the (n−1)th lines in the (n−1)th frames. Thus, the search control unit 102 determines object likelihood information at positions other than the position of a pattern that is clipped out in a previous frame based on the object likelihood information at a position other than the position, and the determined information is set in the object likelihood information storage unit 104. Accordingly, processing loads are temporally distributed, and efficiency of processing cost can be improved.

The search control unit 102 may shift the position of the object likelihood information stored in the object likelihood information storage unit 104 on an input image, in a case where movement of an object is known. For example, there is a technique for generating a motion vector, such as optical flow. The technique is mainly used in encoding of moving images such as MPEG. For example, the search control unit 102 can shift the position of the object likelihood information by applying motion vector information that is generated by applying the technique to a plurality of frame images to the object likelihood information stored in the object likelihood information storage unit 104.

Figure 7A:
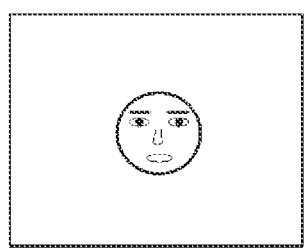
FIGS. 7A to 7E illustrate an example of a shift in position of object likelihood information.
Figure 7B:
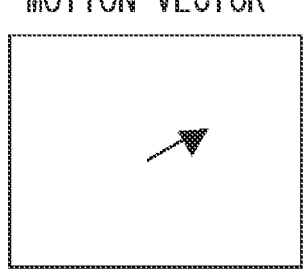
Figure 7C:
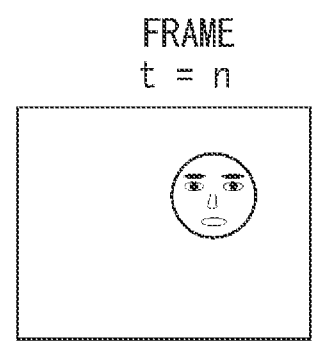
Figure 7D:
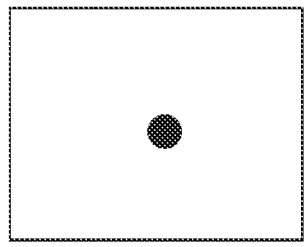
Figure 7E:
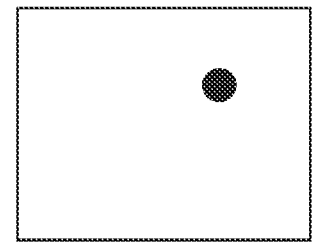

FIGS. 7A to 7E illustrate an example of a shift in position of the object likelihood information. FIG. 7A illustrates a frame image at time t=n−1. FIG. 7C illustrates the frame image at time t=n. FIG. 7B illustrates a motion vector around the position of an object in the frame image from time t=n−1 to time t=n. FIG. 7D illustrates the object likelihood information at the time t=n−1 in a predetermined reduction ratio, that is obtained by binarizing and visualizing. A black circle indicates high object likelihood information. FIG. 7E illustrates the object likelihood information which has been shifted based on the object likelihood information at the time t=n−1 in FIG. 7D and the motion vector in FIG. 7B. When a moving image is compressed and encoded, a motion vector can be generated regardless of presence or absence of an object. The search control unit 102 applies motion vector information to a position of the object likelihood information where no object is detected, so that the searching is efficiently performed only on the positions where the object is more likely to be found and eventually the object can be detected.

There is a conventional technique, such as a Kalman filter and a particle filter, for predicting a current or future position of an object based on past information of positions of the object. When an object is detected, for example, the search control unit 102 uses such a technique for tracking motion of the object, and applies the motion to the object likelihood information stored in the object likelihood information storage unit 104. Then, the search control unit 102 shifts the object likelihood information to decrease a frequency of update of the object likelihood information by the object discrimination unit 103, so that the processing cost can be reduced.

In step S402, the search control unit 102 extends the region with maximum-likelihood information. More specifically, the search control unit 102 replaces the object likelihood information at a position with the maximum likelihood information near the position within a predetermined range. The purpose of the processing in step S402 is to uniformly distribute the regions to be searched in terms of time and space as described in the previous step, so that positions on which no searching is performed can be complemented.

In step S403, the search control unit 102 performs scanning as illustrated in FIG. 4, and sets a sub-window at a position where a likelihood value (object likelihood information) is equal to or more than a predetermined threshold value that corresponds to the position of the sub-window. The search control unit 102 may determine an amount of shift of the sub-window based on the likelihood value. In this case, the search control unit 102 statistically calculates a shift distance corresponding to the object likelihood information to generate a conversion table between the object likelihood information and the amount of shift.

Next, a face discrimination method in step S304 is described below in detail. The object discrimination unit 103 can be realized, as illustrate in FIG. 8, by connecting a plurality of strong discrimination units 601 in series. In the object discrimination unit 103, a former strong discrimination unit 601 discriminates whether input pattern data includes an object, and only when the object is discriminated in the pattern data, a subsequent strong discrimination unit 601 discriminates whether the pattern data includes the object more accurately. Each strong discrimination unit and each weak discrimination unit incorporated therein have a similar configuration, and only differ in a numbers thereof and the discrimination parameters each unit has.

FIG. 9 illustrates an example of the strong discrimination units. The strong discrimination units 601 each includes a plurality of weak discrimination units 701, integrates all pieces of the object likelihood information output from each weak discrimination unit 701 using an adder 702, and performs threshold processing in a threshold process unit 703 to output a result determining whether the object is included.

Figure 10:
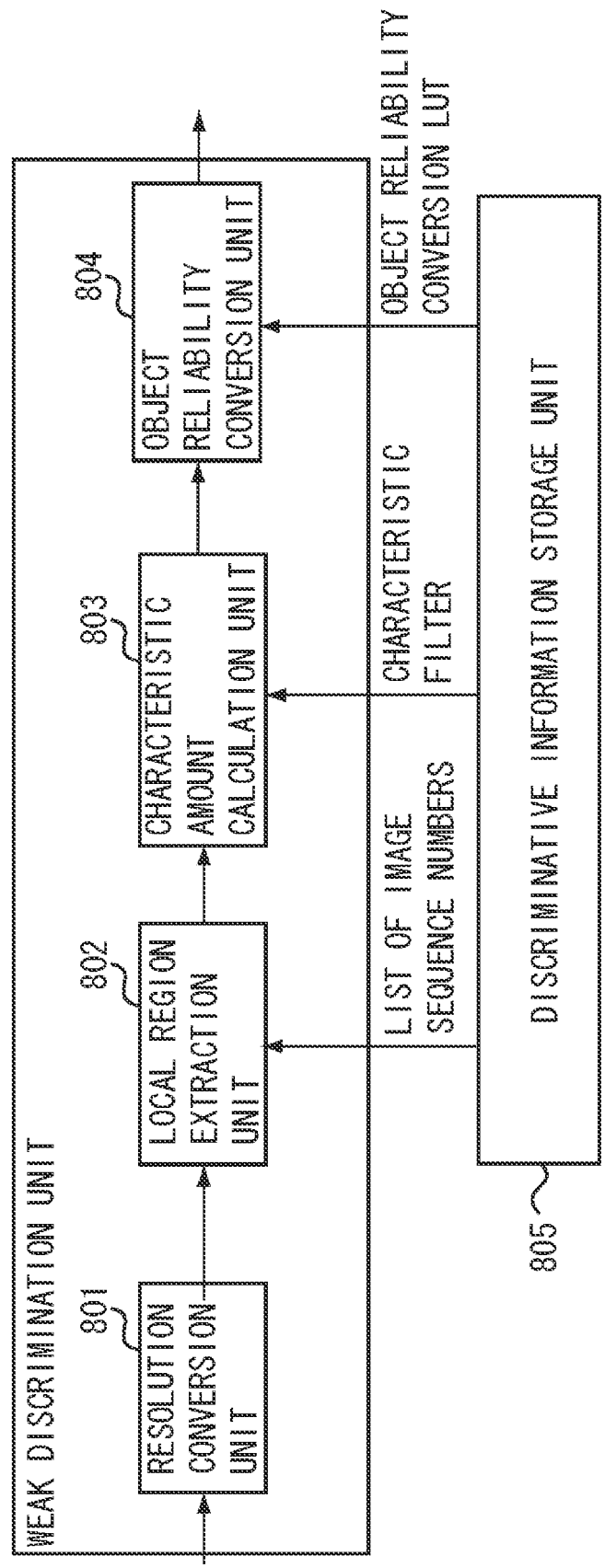
FIG. 10 illustrates an example of a configuration of a weak discrimination unit.

Next, weak discrimination units are described below in detail. FIG. 10 illustrates an example of the weak discrimination units. The weak discrimination units 701 each includes a resolution conversion unit 801, a local region extraction unit 802, a characteristic amount calculation unit 803, and an object reliability conversion unit 804. A discriminative information storage unit 805 feeds discrimination parameters to each unit 701.

Figure 11:
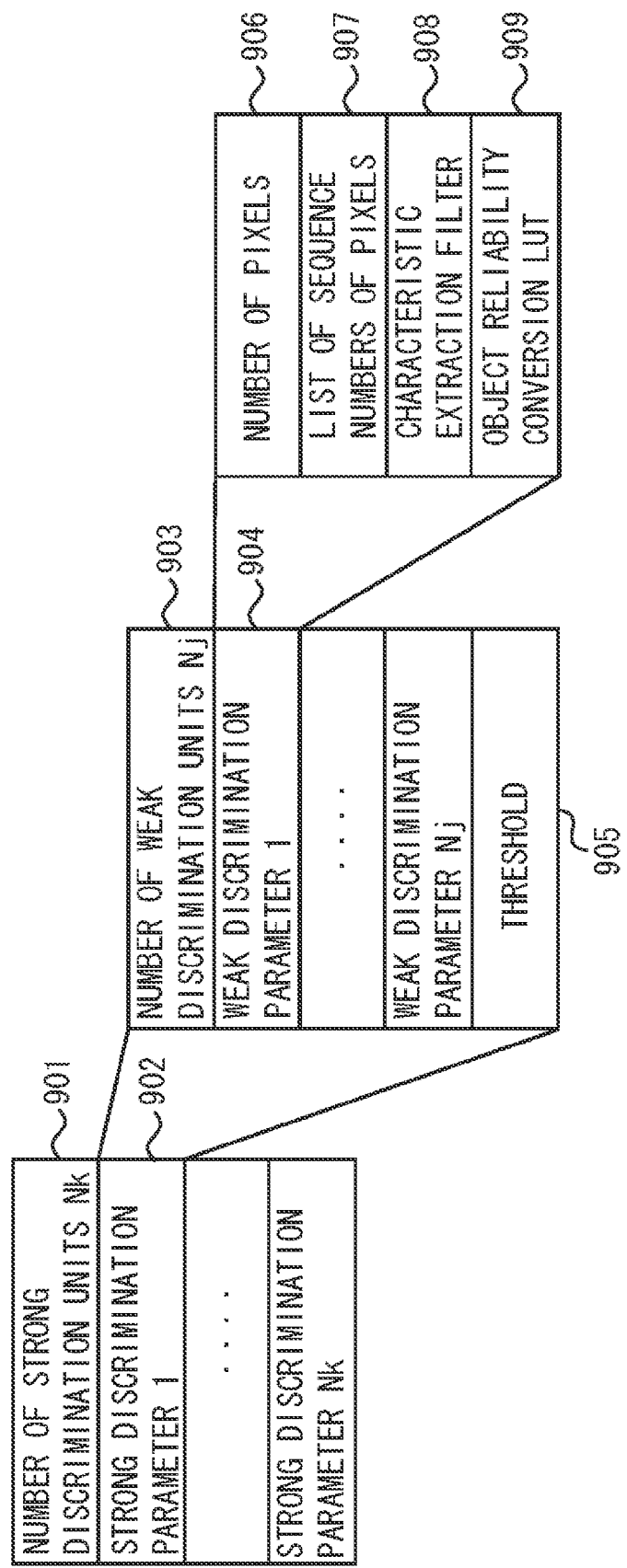
FIG. 11 illustrates discrimination parameters stored in a discriminative information storage unit.

FIG. 11 illustrates discrimination parameters stored in the discriminative information storage unit 805. The discrimination parameters include a number of the strong discrimination units 901 and strong discrimination parameters 902 as many as the number of the strong discrimination units 901. Each of the strong discrimination parameters 902 stores therein the parameters for one strong discrimination unit. Further, each of the strong discrimination parameters 902 includes a number of weak discrimination units 903 and weak discrimination parameters 904 as many as the number of the weak discrimination units 903. Each of the weak discrimination parameters 904 stores therein the parameters for one weak discrimination unit. Each of the weak discrimination parameters 904 includes a number of pixels 906 in each of local regions, a list of sequence numbers of pixels 907 in each of the local regions, and a characteristic extraction filter 908 which is a matrix of one column by a number of rows equal to the number of pixels 906. Each of the weak discrimination parameters 904 further includes an object reliability conversion look-up table (LUT) 909 for converting characteristic amount of an object into reliability thereof.

The sequence numbers of pixels in the present exemplary embodiment is set based on the face pattern including eyes and a mouth that is formed by a matrix of 20 pixels by 20 pixels, as illustrated in FIG. 13. In the present exemplary embodiment, the face pattern is reduced to a half in size to obtain a ½ reduction pattern formed by a matrix of ten pixels by ten pixels. The face pattern is also reduced to a quarter in size to obtain a ¼ reduction pattern formed by a matrix of five pixels by five pixels. The pixels in these patterns are each given sequence numbers from one to 525.

Figure 12:
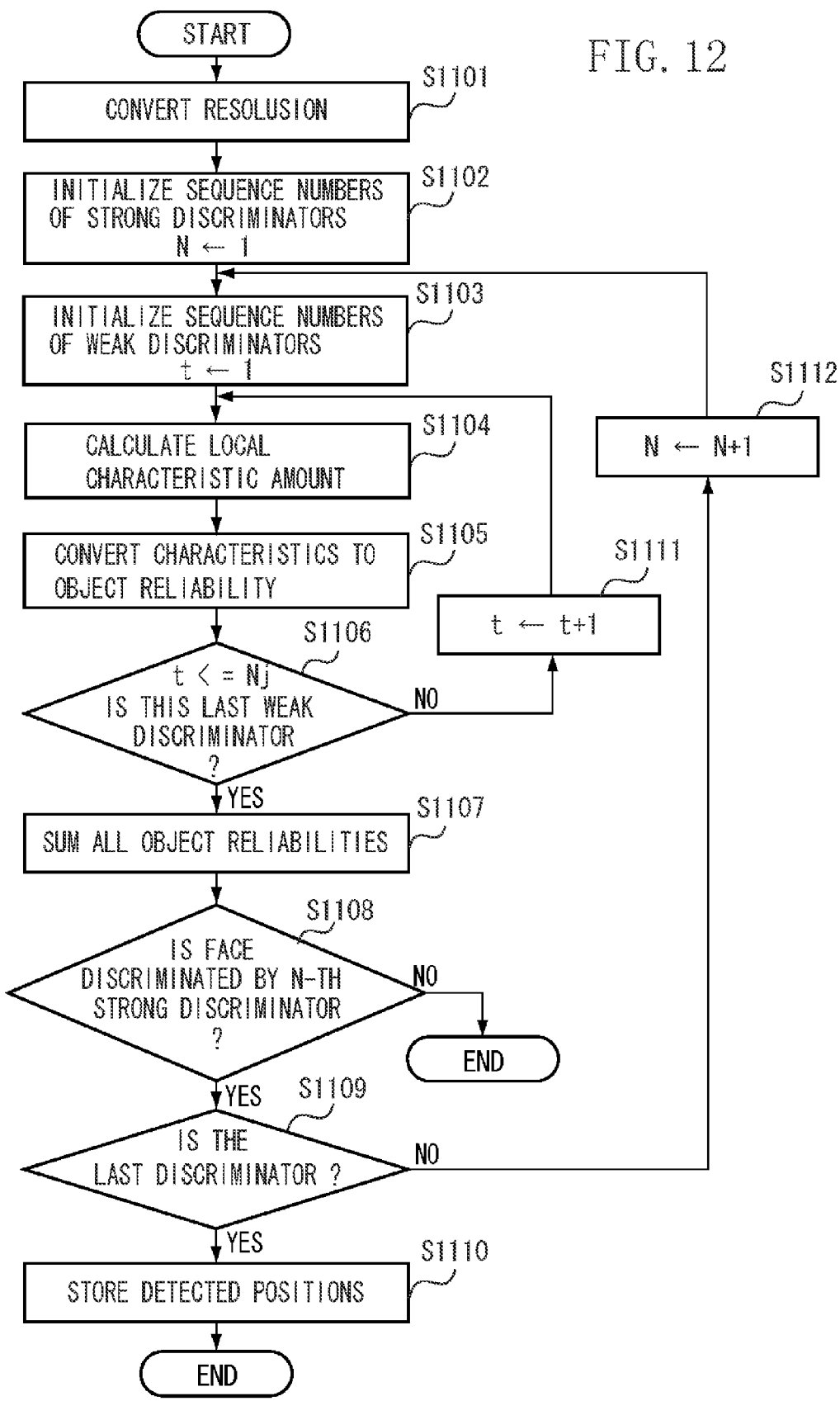
FIG. 12 is a flowchart illustrating an example of processing for face discrimination.

FIG. 12 is a flowchart illustrating an example of processing for face discrimination. In step S1101, the object discrimination unit 103 generates a ½ reduction image and ¼ reduction image of a pattern using the resolution conversion unit 801. In the present exemplary embodiment, the resolution of $½^n$ (n is an integer) is used, but not limited to this. Repeated reductions of an image to about 1/1.2 times thereof also provide images of a plurality of resolutions. Accordingly, the resolution conversion unit 801 may reduce an image by such a ratio to use patterns of an increased number of resolutions. In this case also, no additional processing cost is required. This multi-resolution provides two advantages: a mutual positional relationship between organs in a face can be efficiently collated in a lower resolution pattern, whereas local characteristics of the organs in the face can be accurately collated in a higher resolution pattern.

In step S1102, the object discrimination unit 103 initializes a strong discrimination unit loop counter N. In step S1103, the object discrimination unit 103 initializes a weak discrimination unit loop counter t.

In step S1104, the characteristic amount calculation unit 803 calculates an amount of local characteristics. The amount of local characteristics Ut is calculated using the equation (1):

$$U_{t,N} = \phi_{t,N}^T z_{t,N} \quad (1)$$

wherein subscripts t and N represent a t-th weak discrimination unit in an N-th strong discrimination unit, respectively. $U_{t,N}$ is an amount of local characteristics.
$\phi_{t,N}$ represents characteristic extraction filter 908.
$z_{t,N}$ represents a matrix of one column by the number of rows equal to the number of pixels with luminance components of pixels in a pattern or a reduced pattern indicated by the list of sequence numbers of pixels 907 that is created by the local region extraction unit 802.

In step S1105, the object reliability conversion unit 804 converts the amounts of local characteristics $U_{t,N}$ into an object reliability using the equation (2):

$$H_{t,N} = f_{t,N}(U_{t,N}) \quad (2)$$

wherein $H_{t,N}$ is an output of object reliability.
$f_{t,N}$ is an output by a weak discrimination unit which is obtained by converting the amount of local characteristics $U_{t,N}$ to the object reliability using the object reliability conversion look-up table 909. When an amount of local characteristics $U_{t,N}$ exceeds an upper or lower limit of the conversion table, the object reliability conversion unit 804 sets the amount of local characteristics $U_{t,N}$ as a new upper or lower limit, and refers to the table to obtain the object reliability.

In step S1106, the object discrimination unit 103 repeats the processing in step S1104 to step S1106 by incrementing the number t of the weak discrimination unit in step S1111, until the last weak discrimination unit performs the discrimination processing. When object reliabilities are obtained from every last weak discrimination unit (YES in step S1106), the processing proceeds to step S1107. In step S1107, the adder 702 sums up all of the object reliabilities using the equation (3):

$$H = \Sigma_t H_{t,N} \quad (3)$$

In step S1108, the threshold process unit 703 compares the sum total in step S1107 with a threshold to discriminate an object using the equation (4):

$$H \geq Th_N \quad (4)$$

When the strong discrimination unit 601 determines that the object is not a face (NO in step S1108), the processing is terminated. When the strong discrimination unit 601 determines that the object is a face (YES in step S1108), the processing proceeds to step S1109. In step S1109, the object discrimination unit 103 repeats the processing in step S1103 to step S1109 by incrementing the number N of the strong discrimination unit in step S1112, until the last strong discrimination unit performs the discrimination processing.

The object discrimination unit 103 finally determines that the pattern includes a face only when all of the strong discrimination units discriminate a face (YES in step S1109), and the processing proceeds to step S1110. In step S1110, the object discrimination unit 103 stores therein the position of the pattern, and ends the processing.

An amount of local characteristics in the present exemplary embodiment includes a predetermined resolution, a predetermined size, and linear identifiable characteristics in a local region in a shape among collation patterns, which may be applied to the Proceedings of The IEEE Conference on Computer Vision and Pattern Recognition (CVPR'01) in "Rapid Object Detection using Boosted Cascade of Simple Features".

A method for obtaining object likelihood information is described below. For example, the object discrimination unit 103 obtains in advance a relation between a number of strong discrimination units that information passed through and probability that the information actually includes an object, so that the likelihood can be calculated based on the number of strong discrimination units that the information passed through. In addition, the object discrimination unit 103 obtains in advance a relation between a total sum H of object reliabilities obtained by strong discrimination units and probability that the information actually includes an object, so that the likelihood (object likelihood information) can be calculated based on the sum total of the object reliabilities.

FIG. 14 illustrates a hardware configuration of an image processing apparatus according to a second exemplary embodiment. In FIG. 14, the similar parts as those in the first exemplary embodiment are designated by the same reference numerals.

The second exemplary embodiment is similar to the first embodiment except an optical disk 214, such as a digital versatile disc (DVD) and a compact disc (CD), storing programs is added in the configuration, and the drive interface 204 is connected to an external storage reading/writing apparatus 215 such as a CD/DVD drive. When the optical disk 214 storing a program is inserted in the external storage reading/writing apparatus 215, the CPU 201 reads the program from the storage medium and outputs the program to the RAM 203, accordingly, the processing similar to those in the first exemplary embodiment can be realized.

In the first and second exemplary embodiments, the system extracts a face, but the above described processing may be applied to extraction of any object other than face, including an overall human body, an upper human body, a living thing, and an automobile. In industrial and distribution fields, the above described processing may be applied to identification and check of products, components, distributed articles, and the like.

As described in above exemplary embodiments, searching is performed only on regions where an object is likely to exist, so that the object can be efficiently detected from a moving image.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-005020, filed Jan. 13, 2009, which is hereby incorporated by reference herein in its entirety.

What is claimed is:

1. An image processing apparatus comprising:
   a moving image input unit configured to input a moving image;
   a storage unit configured to store object likelihood information in association with a corresponding position in a frame in the moving image;
   a setting unit configured to sequentially set a plurality of collation patterns in a frame with respective positions based on the object likelihood information stored in the storage unit; and
   a determination unit configured to derive object reliability information for each of the collation patterns, determine whether each of the collation patterns represents an object based on the derived object reliability information, and update the object likelihood information stored in the storage unit in association with a position of each of the collation patterns.

2. The image processing apparatus according to claim 1, wherein the setting unit determines the positions of the collation patterns based on a position associated with object likelihood information that exceeds a predetermined threshold among pieces of the object likelihood information stored in the storage unit.

3. The image processing apparatus according to claim 1, wherein the determination unit determines object likelihood information at a position other than the positions of the collation patterns derived for a former frame based on the object likelihood information at a position other than the position, and stores the derived object likelihood information in the storage unit.

4. The image processing apparatus according to claim 1, wherein the determination unit generates motion vector information based on a plurality of frames, determines object likelihood information at a position other than the positions of the collation patterns derived for a former frame based on the object likelihood information at a position determined based on the motion vector information, and stores the derived object likelihood information in the storage unit.

5. The image processing apparatus according to claim 1, wherein the setting unit determines an amount of movement, for moving to sequentially set the collation patterns based on the object likelihood information stored in the storage unit.

6. A method for image processing in an image processing apparatus, the method comprising:
   inputting a moving image;
   sequentially setting a plurality of collation patterns in a frame with respective positions based on object likelihood information stored in a storage unit configured to store the object likelihood information in association with a corresponding position in a frame in the moving image; and
   deriving object reliability information for each of the collation patterns, determining whether each of the collation patterns represents an object based on the object reliability information obtaining the object likelihood information based on the object reliability information for each of the collation patterns, and updating the object likelihood information stored in the storage unit in association with a position of each of the collation patterns.

7. A computer-readable storage medium storing a program that causes a computer to execute a method, the method comprising:
   inputting a moving image;
   sequentially setting a plurality of collation patterns in a frame with respective positions based on object likelihood information stored in a storage unit configured to store the object likelihood information in association with a corresponding position in a frame in the moving image; and
   deriving object reliability information for each of the collation patterns, determining whether each of the collation patterns represents an object based on the object likelihood information obtaining the object likelihood information based on the object reliability information and updating the object likelihood information stored in the storage unit in association with a position of each of the collation patterns.

8. The image processing apparatus according to claim 1, further comprises a generation unit configured to generate frames of a plurality of sizes by sequentially reducing a frame in the moving image,
   wherein the setting unit sets the collation patterns in a frame generated by the generation unit.

9. The image processing apparatus according to claim 8, wherein the storage unit stores object likelihood information in association with a position in a frame and a size of the frame.

* * * * *